United States Patent [19]

Johnson

[11] Patent Number: 4,715,681
[45] Date of Patent: Dec. 29, 1987

[54] BICYCLE REFLECTOR FOR HANDLEBAR ATTACHMENT

[76] Inventor: William M. Johnson, P.O. Box 70404, Eugene, Oreg. 97401

[21] Appl. No.: 835,371

[22] Filed: Mar. 3, 1986

[51] Int. Cl.⁴ ............................ G02B 5/08; G02B 7/18
[52] U.S. Cl. ..................................... 350/99; 350/632; 350/638
[58] Field of Search ................ 350/99, 248, 638, 632, 350/635, 639, 640

[56] References Cited

U.S. PATENT DOCUMENTS

| | | | |
|---|---|---|---|
| D. 247,292 | 2/1978 | Brown | D12/189 |
| 702,763 | 6/1902 | Aurness. | |
| 4,135,788 | 1/1979 | Sargis | 350/632 |
| 4,441,681 | 4/1984 | Oda et al. | 248/475.1 |
| 4,575,189 | 3/1986 | Johnson | 350/99 |
| 4,603,944 | 8/1986 | Greenlaw et al. | 350/638 |

FOREIGN PATENT DOCUMENTS 936465  9/1963  United Kingdom ................. 350/99

Primary Examiner—John K. Corbin
Assistant Examiner—Loha Ben
Attorney, Agent, or Firm—James D. Givnan, Jr.

[57] ABSTRACT

An expandable plug for insertion into a bicycle handlebar end with a first arm member projecting from the plug. A second arm member is pivotally coupled to the first arm member. The second arm member may be segmented with a helical spring thereon so as to yieldably support a reflector at the end of the second arm member. The reflector is fully adjustable about multiple axes to provide optimum reflection regardless of handlebar relationship to path of bicycle.

5 Claims, 5 Drawing Figures

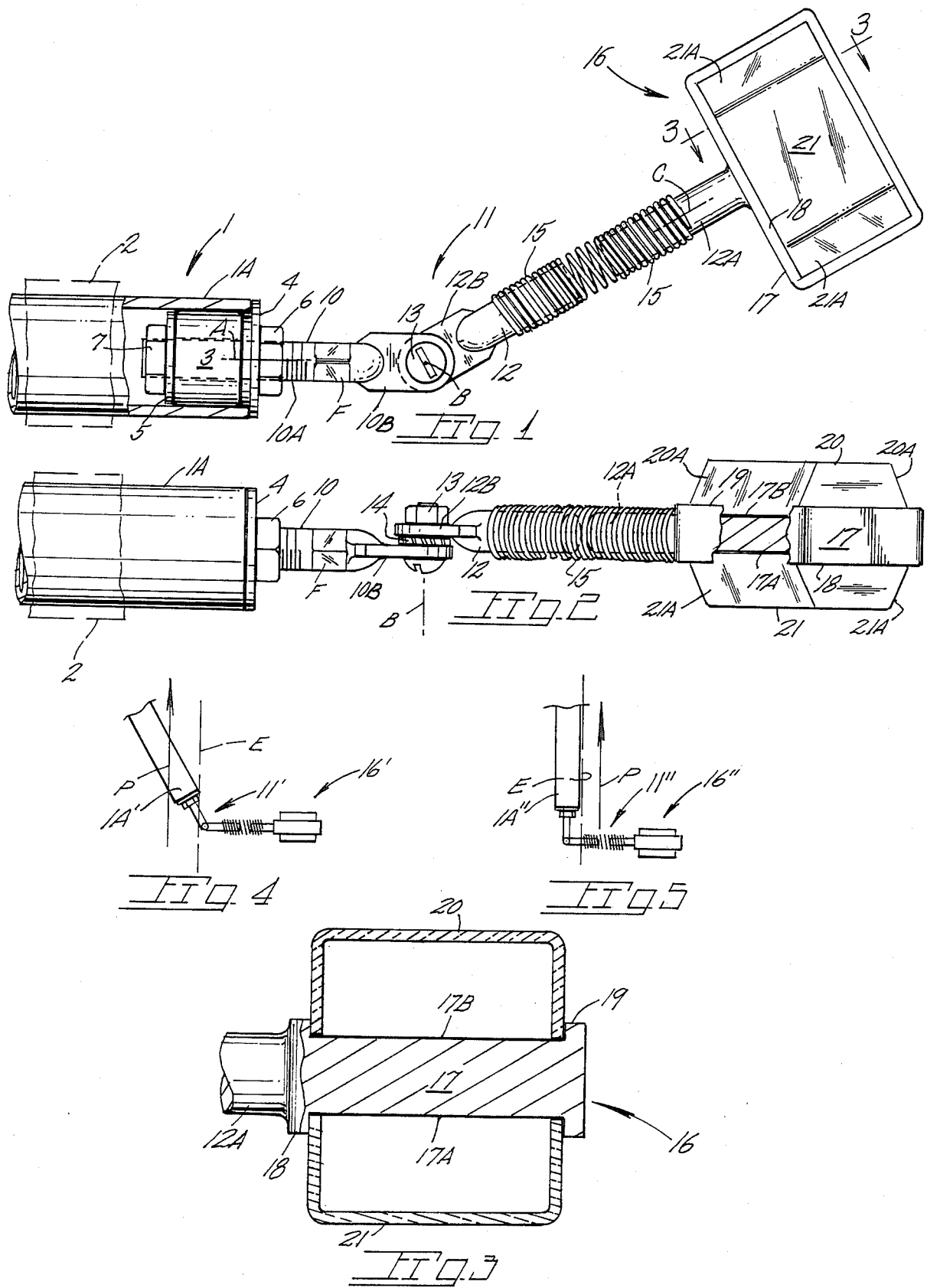

BICYCLE REFLECTOR FOR HANDLEBAR ATTACHMENT

BACKGROUND OF THE INVENTION

The present invention pertains generally to bicycle accessories and particularly to a reflector for attachment to a bicycle handlebar in an adjustable manner for optimum reflection.

Important to a vehicle reflector in addition to being highly positionable is the mounting of the reflector to indicate the lateral limits of the vehicle. Further, it is important that reflected light be directed toward traffic traveling in the same general direction as the bicycle. Toward this end some reflectors have been mounted on elongate supports projecting from one or both sides of a bicycle frame. Such reflectors and their support structure are subject to accidental contact with the bicycle rider as well as subject to damage in the event of ground impact. Further, some bicyclists may not wish to detract from the apperance of the vehicle by reasons of attaching widely spaced apart reflectors to the bicycle frame. Frame attachment of the reflector mounting means can also result in marring of the bicycle frame finish.

SUMMARY OF THE PRESENT INVENTION

The present invention is embodied within an adjustable assembly for attachment to the end of a handlebar for the support of a reflector or the like.

An expandable mounting plug of the present attachment is adapted for installation into a handlebar with expansion of the plug effecting secure attachment. Arm means supported by the expandable mounting means adjustably carries a reflector located in outward spaced relationship to the handlebar end. The reflector or mirror is positionable to reflect light along the bicycle path of travel regardless of the angular relationship of the handlebar to the path of bicycle travel i.e., perpendicular, parallel or inclined to said path of travel. Accordingly, the present reflector assembly is usable on any handlebar equipped vehicle including motorcycles, scooters, ATV's regardless of handlebar configuration to provide reflection along the path of vehicle travel. A flexible member of the reflector assembly permits vibratory movement of the reflector, induced by road shock, to further attract the attention of the motorist.

Pivot means joining first and second arm members of the reflector assembly provide an axis about which a reflector may be adjusted. The embodiment of the above noted flexible member in a helical spring permits adjusted rotation of the reflector about still another axis. Still further, the present reflector assembly may be attached to the handlebar end in a specific, rotated relationship about a third axis for the purpose of providing desired light reflection from the reflector. A reflector base is recessed to securely mount fore and aft reflectors to warn oncoming motorists as well as overtaking motorists.

The reflector assembly includes arm means having a first arm member along which a nut element may be advanced to expand an elastomeric plug for frictional engagement with the internal periphery of a handlebar end segment.

Important objectives include the provision of a reflector assembly for attachment at the outer extremities of a vehicle envelope to indicate to motorists the lateral extremities of the bicycle or other vehicle; the provision of a reflector assembly for attachment to a vehicle handlebar which avoids bracket attachment to a bicycle frame resulting in possible marring of the frame finish and conflict with the rider while dismounting and mounting the bicycle; the provision of a reflector assembly which may be adjusted to provide optimum light reflection toward oncoming and overtaking vehicles regardless of the angular relationship of a handlebar end segment to the bicycle path of travel; the provision of a reflector assembly of low cost, sturdy construction and capable of withstanding impacts from accidental ground contact; the provision of a reflector assembly with pivotalling joined arm members which may be locked in angular relationship from one another with one of said arm members including a flexible member permitting a reflector carried by the arm member to oscillate in an eye-catching manner; and the provision of a reflector assembly that is attachable to a bicycle handlebar with light reflection being intermittent to a viewer by reason of handlebar steering motion.

BRIEF DESCRIPTION OF THE DRAWINGS

In the accompanying drawings:

FIG. 1 is a rear elevational view of the present reflector assembly protruding from a handlebar end segment disposed normal to the path of travel;

FIG. 2 is a top plan view of FIG. 1;

FIG. 3 is a sectional view taken along line 3—3 of FIG. 1 showing reflector details; and FIGS. 4 and 5 are top plan views of the present reflector assembly in place within handlebar end segments shown respectively as inclined and parallel to the path of bicycle travel.

DETAILED DESCRIPTION OF THE PREFERRED EMBODIMENTS

With continuing attention to the drawings wherein applied reference numerals indicate parts similarly hereinafter identified, the reference numeral 1 indicates a portion of a vehicle tubular handlebar having an end segment 1A on which may be a handgrip 2.

Installed within the handlebar end segment is an elastomeric plug 3 constituting part of the following described expandable mounting means. Plug 3 is confined intermediate a handlebar abutting disc 4 and a washer 5, the latter disposed internally within the handlebar end segment. Adjustable means includes a nut element at 6 which may be adjusted toward a nut 7 to impart expansion to plug 3 causing frictional engagement of the exterior of same with the internal wall of the handlebar end segment.

A first arm member 10 of the arm means indicated generally at 11 and extends through an opening in plug 3 and includes a threaded segment 10A with which nut element 6 is engaged. From the foregoing it will be seen that rotation of nut element 6 will cause washer 5 to be biased against plug 3 to expand same into handlebar contact. Alternatively, arm 10 may be provided with flats at F to permit tool application to arm 10 for rotation of same during installation with nut element 6 serving as a lock nut.

The arm member 10 is rotationally adjustable about its major axis at A.

With attention again to arm member 10, a companion or second arm member is indicated at 12. Flattened end portions of the first and second arm members as at 10B and 12B are each apertured to receive a fastener assembly 13 having an axis B and including a serrated lock washer 14 to provide arm members of an articulated nature.

The second arm member 12, in a preferred form, is segmented with a segment at 12A with the arm segments 12 and 12A coupled to one another by a helical spring 15. The opposed arm segment ends are spaced from one another to yieldably support arm segment 12A to permit same to move in response to loads resulting from road shocks imparted to the vehicle handlebar during vehicle travel along a roadway. Helical spring 15 is preferably of non-uniform coil spacing with wider spaced coils at its mid-portion to contribute to oscillation of the later described reflector.

A reflector indicated generally at 16 is carried by the second arm member and includes a base 17 having a raised perimeter 18 and 19 within which are inserted forwardly and rearwardly facing, cup shaped reflectors 20 and 21. Reflectors 20 and 21 are preferably of the four faceted type intended for use on bicycles and accordingly constructed from impact resistant, reflective material. One such reflector suitable for present purposes is that sold under the trademark Sate-Lite and having a reflective, four faceted inner surface. Such reflectors include reflective surfaces as at 20A and 21A. A suitable adhesive applied to the inner perimeter of each reflector assures permanent securement to the recessed surfaces 17A and 17B of reflector base 17. Arm segment 12A is rotatably engageable with spring 15 and hence may be positioned about arm axis C for desired reflection.

With attention to FIGS. 4 and 5 showing top plan views of the present invention in place on different handlebars, the path or course of the handlebar equipped vehicle is indicated at P while a lateral extremity of the vehicle is indicated at E. Typically the lateral extremities of a handlebar equipped vehicle will be denoted by the handlebar ends. Handlebar end segments are indicated at 1A' and 1A" with the arm means indicated generally at 11' and 11" and reflectors generally at 16' and 16". It will be seen that regardless of the handlebar end segments angular relationships to the vehicle path P the reflector 16 may be adjusted about multiple axes at A, B and C to reflect in the manner desired. While the term reflector is used, it is to be understood that the term encompasses a mirror for viewing other vehicular traffic.

It is apparent that the present reflector could be formed and used without the flexible spring member 15 and with arm 12 being continuous. The provision of the present reflector assembly permitting adjustment of the reflector 16 about axes A, B and C additionally permits optimum reflector positioning regardless of the handlebar end segment being in other than a horizontal plane. By utilizing the handlebar end as an attachment point, the present reflector assembly advantageously increases the transverse section of the vehicle thereby providing an increased safety factor for the rider without relying on unattractive reflector supporting arrangements.

While I have shown but a few embodiments of the invention, it will be apparent to those skilled in the art that the invention may be embodied still otherwise without departing from the spirit and scope of the invention.

Having thus described the invention, what is claimed and desired to be secured in a Letters Patent is:

1. A reflector asssembly for inserted attachment to a tubular structure of a vehicle, sasid assembly comprising,
    expandable mounting means including a plug of elastomeric material, adjustable means acting on said plug to radially expand same when positioned within the tubular structure to secure same therein,
    articulated arm means including a threaded arm segment extending through said plug and on which said adjustable means are carried for acting on said plug, and a reflector carried by said arm means and offset from said plug.

2. The assembly claimed in claim 1 wherein said arm means comprises first and second arm members, one of said arm members including multiple arm segments and a flexible member therebetween to yieldably support the reflector.

3. The assembly claimed in claim 2 wherein said expandable mounting means including a nut element for advancement along said threaded arm segment to expand said plug.

4. The assembly claimed in claim 2 wherein said arm means additionally includes pivot means joining said first and second arm members and permitting adjusted positioning of said second arm members about the aaxis of said pivot means.

5. The assembly claimed in claim 4 wherein said flexible member is a helical spring, said helical spring in inserted and rotatably adjustable engagement with at least one of said arm segments permitting rotational adjustment of the reflector about the major axis of said one of said arm segments.

* * * * *